Aug. 15, 1950  E. W. WITT  2,518,967
MACHINE FOR FORMING PNEUMATIC TIRE CARCASSES
Filed Aug. 2, 1946  2 Sheets-Sheet 1

INVENTOR
EARNEY W. WITT
By Young, Emery & Thompson
Attys—

Aug. 15, 1950 E. W. WITT 2,518,967
MACHINE FOR FORMING PNEUMATIC TIRE CARCASSES
Filed Aug. 2, 1946 2 Sheets-Sheet 2
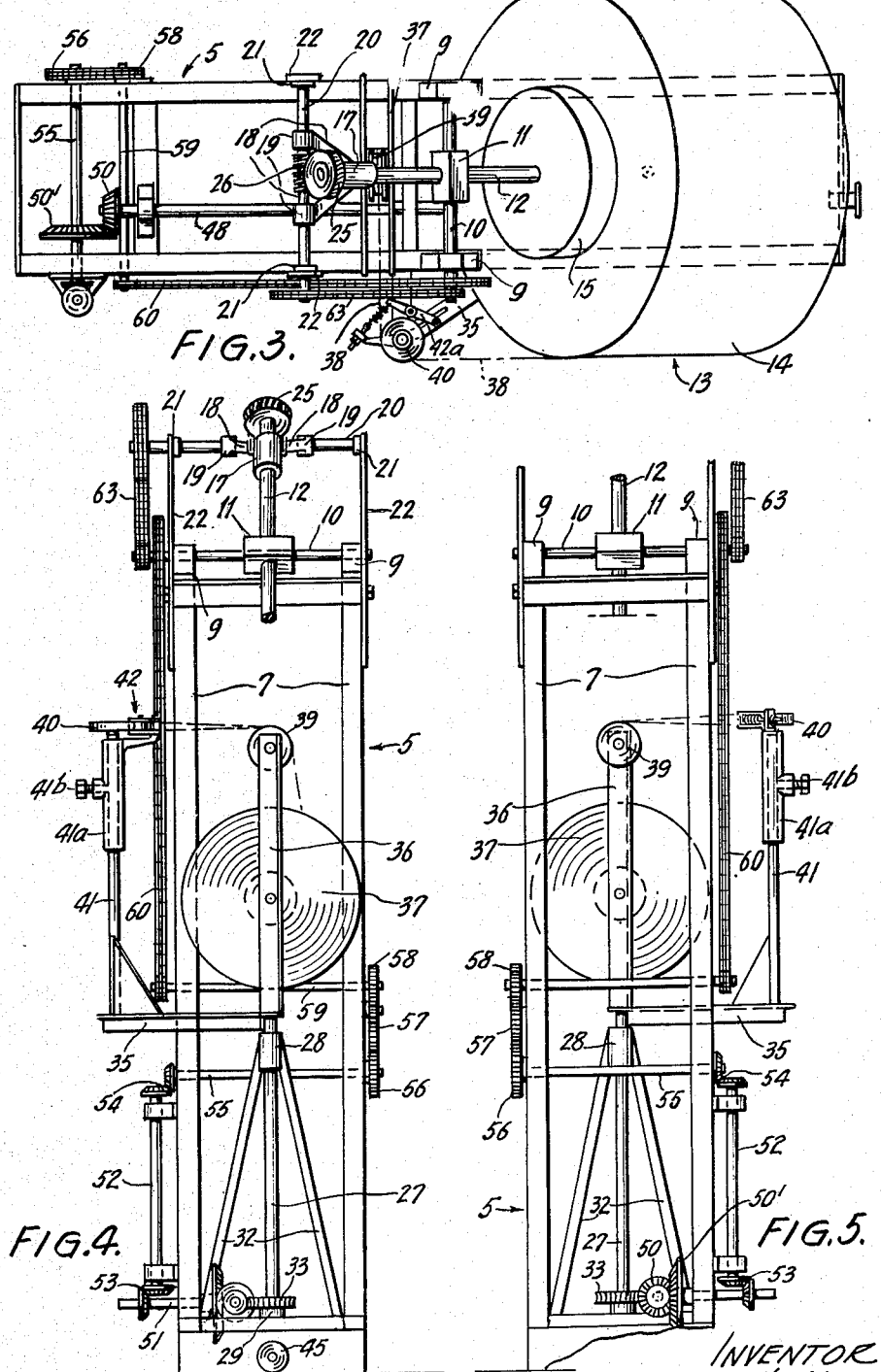
INVENTOR
EARNEY W. WITT
By Young, Emery & Thompson
ATTYS Patented Aug. 15, 1950

2,518,967

UNITED STATES PATENT OFFICE 2,518,967

MACHINE FOR FORMING PNEUMATIC TIRE CARCASSES

Earney William Witt, Windsor, Victoria, Australia, assignor to Spiral Tyre Development Company Limited, Melbourne, Victoria, Australia Application August 2, 1946, Serial No. 687,813
In Australia August 24, 1945

7 Claims. (Cl. 154—9)

This invention relates to machines for forming pneumatic tire carcasses and of the type in which strip material (such as rubber cord) is wound upon a rotating former having axially projecting end flanges whereby the strip material is guided and laid upon the rotating former in required arrangement to form a tire carcass.

In a machine of this type, described in the specification of my Patent No. 2,352,055, a carcass former is rotated about a vertical axis and simultaneously about its longitudinal axis which is inclined to and intersects the vertical axis at the geometrical center of the carcass former, rotation about the vertical axis drawing and winding strip material upon and about the carcass former and rotation about the longitudinal axis determining the spacing of the strip convolutions wound upon the carcass former.

Now the principal objective of the present invention is to provide an improved machine of this type of simple construction, whereby correct laying of the strip material upon the carcass former is readily achieved and an increased rate of production is attained.

A further objective of the invention is the provision of means whereby the angular arrangement of the convolutions of strip material to comprise a tire carcass may be readily adjusted as required for the formation of the carcasses of various sizes.

Achieving the above stated principal objective and according to the invention, a tire carcass forming machine of the type specified, comprises a rotatable supporting shaft, strip winding means carried by the supporting shaft and rotatable about the extended axis of said shaft, a strip supply seal carried by said winding means and movable therewith, a rotatable shaft inclined to the extended axis and intersecting said axis at the center of rotation of the strip winding means, a carcass former secured to said inclined shaft and disposed with its geometrical center at said center of rotation, and gearing positively interconnecting said shafts to rotate the strip winding means and the carcass former at relative rotational speeds.

As the carcass former rotates and the strip winding means simultaneously traverses the orbital path, the strip material is laid obliquely upon the carcass former and the successive windings of strip material are laid side by side or are overlapped or spaced apart as required.

At the termination of the carcass forming operation, the completed tire carcass is removed from the former and subsequently moulded to form a tire.

In attaining the above second recited objective of the invention, the longitudinal axis of the carcass former is arranged so as to be angularly adjustable in relation to the plane of the orbital path of the strip winding means, while an axial adjustment is provided for the strip winding means, whereby the latter may be adjusted to correspond with angular adjustments of the longitudinal axis, and a transverse adjustment is provided for the strip winding means, whereby the axial mounting may be adjusted to maintain its alignment with the geometrical center of the carcass former to conform with changes in position of said center consequent upon angular adjustments of the longitudinal axis.

The carcass former and the strip winding means are interconnected by gearing actuated by a driving member, and variable speed means are provided in the gearing whereby the relative rotational speeds of the carcass former and the strip winding means are adjusted to change the pitch or spacing of the strip winding or convolutions wound upon said carcass former. Moreover, means are provided whereby the tension of the strip during the winding operation may be varied as and when required.

The accompanying drawings illustrate one practical embodiment of a tire carcass forming machine constructed in accordance with the invention.

In these drawings:

Fig. 3 is a plan of the machine.

Fig. 4 is a front elevation with the carcass former removed.

Fig. 5 is a rear elevation with certain parts omitted.

Figures 1, 2:
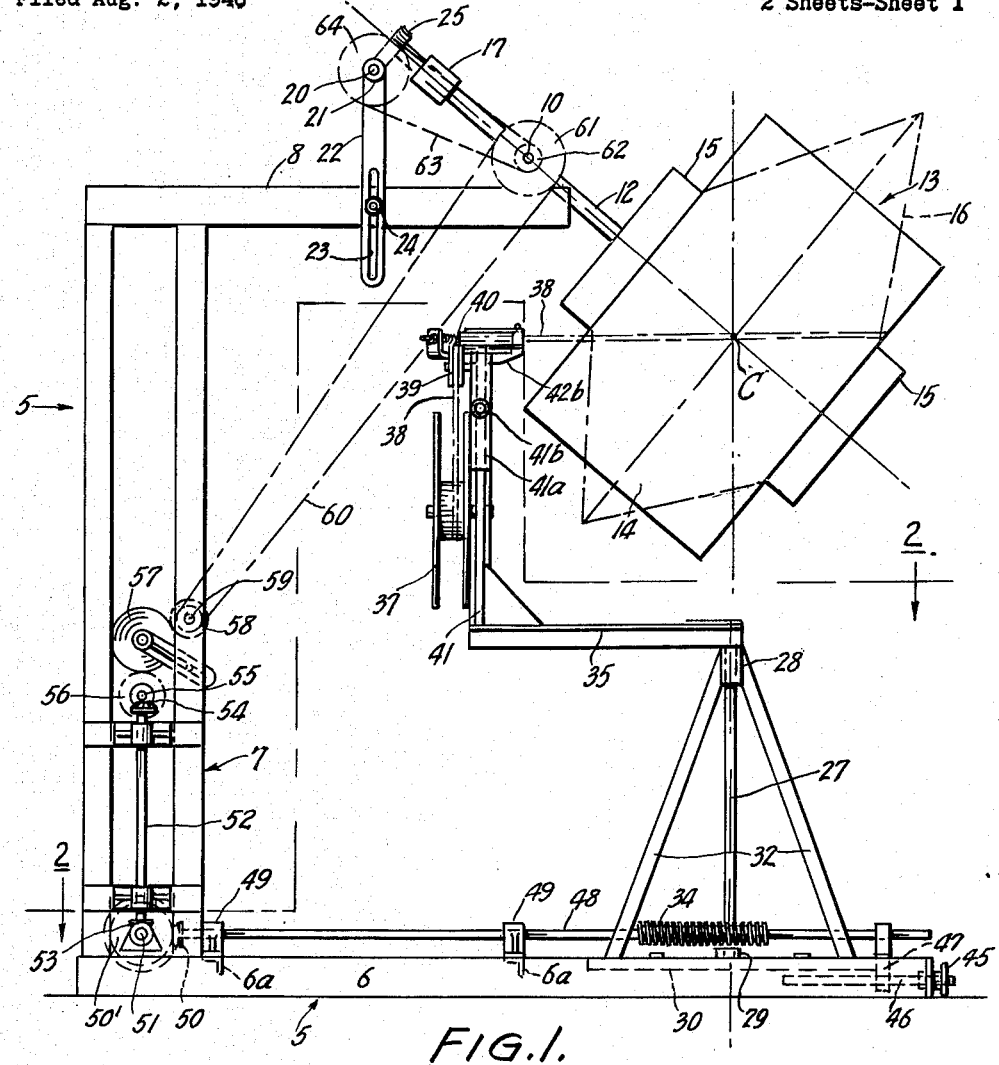
Fig. 1 is a side elevation of a tire carcass forming machine in accordance with the invention.
Fig. 2 is a plan view of the line 2—2 of Fig. 1.

The machine illustrated comprises a fabricated angle iron frame-work 5 having a base 6, column 7 and horizontal cantilever portion 8 fixed to the upper end of column 7. The base 6 is formed of two spaced angle-irons with suitable transverse members 6a and column 7 is formed of four vertical angle-irons attached to one end of the base member 6. The cantilever portion 8 is formed of two spaced arms or angle-irons, each fixed to the ends of adjacent pairs of the vertical angle-irons of the column 7.

The outer ends of the spaced angle-irons forming the cantilever portion 8 have each mounted thereon a bearing 9 in which is journalled a transverse shaft 10 at the center of which latter is positioned a bearing block 11 through which passes and is rotatably fitted a shaft 12 supporting a carcass former 13.

The carcass former 13 has a body 14 in the form of a drum and having flanges 15 projecting axially from each end of said body 14. Alternatively the body 14 may be formed with converging sides 16 as illustrated in broken lines in Fig. 1.

The upper end of shaft 12 is supported in a bearing 17 carried on arms 18 fixed to bearings 19 through which latter passes a transverse shaft 20. The shaft 20 is journalled in bearings 21 carried on arms 22 adjustably mounted on the arms of the cantilever portion 8. The adjustable mounting of arms 22 is achieved by slots 23 formed on said arms, said slots engaging bolts 24 by means of which the arms 22 are set and retained in adjusted position. The adjustment of said arms 22 effects a variation of the inclination of shaft 12 about a pivot formed by the transverse shaft 10. The upper end of shaft 12 extending from the bearing 17 is provided with a worm wheel 25 which meshes with a worm 26 mounted on transverse shaft 20.

Positioned below the carcass former 13 and vertically below and in alignment with the geometrical centre C of said former is a vertical shaft 27 supported in upper and lower bearings 28 and 29 respectively. The lower bearing 29 is carried on transverse members 31 of a frame 30 mounted for sliding movement on the spaced angle arms of the base 6 and the upper bearing 28 is carried by struts 32 fixed to said frame 30.

The lower end of shaft 27 is provided with a worm wheel 33 meshing with worm 34 which is driven in a manner to be hereinafter described.

Fixed to the upper end of shaft 27 is the apex of a triangular frame 35 to which is fixed a vertical pillar 36 at one corner of said frame 35. Mounted for rotation on the pillar 36 is a reel 37 of strip material 38 which is fed from the reel 37 over a guide roller 39 mounted on the upper end of the pillar 36.

The strip material then passes over a second guide or winding roller 40 mounted for rotation in a horizontal plane on the upper end of a pillar 41 fixed to the other corner of the frame 35.

The winding roller 40 is rotatably supported upon a sleeve 41a which is slidably adjustable on the pillar 41 and is retained in adjusted position by a clamping screw 41b, so that the roller 40 may be raised or lowered for a purpose to be described presently.

The winding roller 40 is provided with adjustable friction braking means 42 whereby tension of the strip material may be varied during the winding operation. The friction braking means 42 comprises a brake shoe 43 mounted upon an arm 42a pivoted on a bracket 42b on the sleeve 41a, to engage the periphery of roller 40 under the control of the adjustable tension spring 44.

The sliding frame 30 is movable longitudinally by means of hand wheel 45 arranged to effect rotation of threaded rod 46 which engages a complementary threaded opening in end member 47 of the frame 30.

The worm 34 is sufficiently long to allow movement of frame 30 and yet remain in mesh with worm wheel 33, said worm 34 being carried on shaft 48 journalled in bearings 49 supported in transverse members 6a. The other end of the shaft 48 is provided with a bevel pinion 50 meshing with bevel wheel 50' mounted on main driving shaft 51 mounted in bearings carried in the base of column 7.

A vertical shaft 52 is driven from shaft 51 by bevel gears 53, and bevel gears 54 impart drive to a counter shaft 55 also mounted in bearings fixed to column 7. On one end of the countershaft 55 is a gear wheel 56 coupled through change speed idler gear 57 to gear 58 mounted on one end of a shaft 59 journalled in spaced angle-iron members of the column 7. The other end of shaft 59 is provided with a chain sprocket which is drive coupled through chain 60 to sprocket 61 freely mounted on transverse shaft 10. The drive is then imparted to shaft 20 through a sprocket 62, operatively connected with the sprocket 61, chain 63 and sprocket 64 to drive the shaft 12 carrying the former 13.

In operation a tire carcass former 13 is mounted on shaft 12, which is adjusted to a required angle of inclination according to the setting, selected by the operator, of the arms 22. Such setting is determined by the size of the tire carcass being formed and the size of the bead opening in the carcass.

The shaft 27 is then adjusted by hand wheel 45 so that the axis of said shaft is in vertical alignment with the geometrical center C of the former 13, and the sleeve 41a is adjusted upon the pillar 41 to set the winding roller 40 in horizontal alignment with said geometrical centre.

Strip material 38 is then drawn from the reel 37 over guide rollers 39 and 40 and secured to the former 13, whereupon, power is applied to the shaft 51 to rotate, through the gearing above described, the shafts 12 and 27 and therewith the carcass former 13 and the frame 35 and roller 40, the latter revolving in an orbital path about the rotating carcass former.

The former 13 and frame 35 are driven about their respective axes and the strip material 38 is continuously drawn from the reel 37 and wound obliquely across the face and ends of the former 13 by the orbitary revolving roller 40 so that successive windings of the strip material are laid on the carcass former substantially in a plane passing through the upper and lower obliquely opposite corners at the junctions of the flanges 15 with the body 14 of said carcass former, the geometrical centre C and the winding roller 40.

The beads of the tire carcass are formed at the bases of the flanges 15 on the former 13 and the desired relationship of the successive layers of strip material in spaced, contiguous or overlapped arrangement is effected by the selection of relative rotational speeds of the carcass former 13 and frame 35 carrying the strip material 38 and the guide roller 39 and winding roller 40. The change speed gear 57 provides a convenient means for variation of the relative rotational speeds.

A required tension is imparted to the strip material by means of adjustment to friction braking means 42.

On completion of the tire carcass the former 13 is removed from shaft 12 and the carcass removed from the said former in known manner.

I claim:

1. A machine of the type herein specified for forming pneumatic tire carcasses comprising a rotatable supporting shaft, strip winding means carried by the supporting shaft and rotatable about the extended axis of said shaft, a strip supply reel carried by said winding means and movable therewith, a rotatable shaft inclined to the extended axis and intersecting said axis at the center of rotation of the strip winding means, a carcass former secured to said inclined shaft and disposed with its geometrical center at said center of rotation, and gearing positively interconnecting said shafts to rotate the strip winding means and the carcass former at relative rotational speeds.

2. A machine as claimed in claim 1, wherein the inclined shaft is angularly adjustable to change the position of the carcass former, and the supporting shaft and the strip winding means are respectively laterally adjustable and axially adjustable to conform with changes in position of the carcass former.

3. A machine as claimed in claim 1 wherein the strip winding means includes a strip feeding roller co-operative with the carcass former to draw strip from the reel and wind said strip upon the carcass former.

4. A machine of the type herein specified for forming pneumatic tire carcasses comprising a rotatable supporting shaft, strip winding means carried by the supporting shaft and rotatable about the extended axis of said shaft, a strip supply reel carried by said winding means and movable therewith, a rotatable shaft inclined to the extended axis and intersecting said axis at the center of rotation of the strip winding means, a carcass former secured to said inclined shaft and disposed with its geometrical center at said center of rotation, and gearing positively interconnecting said shafts to rotate the strip winding means and the carcass former at relative rotational speeds, said strip winding means including a strip feeding roller cooperative with the carcass former to draw strip from the reel and wind said strip upon the carcass former, and means for adjusting and maintaining the tension of the strip as the latter is wound on the carcass former.

5. A machine as claimed in claim 4 wherein the tension adjusting means comprises an adjustable friction brake in contact with the feeding roller.

6. A machine as claimed in claim 1 wherein the strip winding means is carried by a slidably adjustable frame whereon the supporting shaft is rotatably mounted, and the strip winding means is adjustable on said frame or carriage in a direction parallel with the axis of the supporting shaft.

7. A machine as claimed in claim 1, wherein the interconnecting gearing is provided with change wheels, whereby the relative rotational speed of the supporting shaft and the inclined shaft may be adjusted.

EARNEY WILLIAM WITT.

REFERENCES CITED

The following references are of record in the file of this patent:

UNITED STATES PATENTS

| Number | Name | Date |
| --- | --- | --- |
| 1,362,524 | Bullis | Dec. 14, 1920 |
| 1,409,671 | Clauss | Mar. 14, 1922 |
| 1,526,572 | Ten Eyck | Feb. 17, 1925 |
| 1,625,983 | Carter | Apr. 26, 1927 |
| 2,231,092 | Schenck | Feb. 11, 1941 |
| 2,352,055 | Witt | June 20, 1944 |
| 2,370,254 | Mickelson | Feb. 27, 1945 |